US008626199B2

(12) United States Patent
You et al.

(10) Patent No.: US 8,626,199 B2
(45) Date of Patent: Jan. 7, 2014

(54) METHOD FOR PC TO REALIZE A-GPS

(75) Inventors: Meng-zhe You, HuiZhou (CN); Jing-gao Zhou, HuiZhou (CN); Cong Li, HuiZhou (CN)

(73) Assignee: Huizhou TCL Mobile Communication Co., Ltd., Guangdong (CN)

( * ) Notice: Subject to any disclaimer, the term of this patent is extended or adjusted under 35 U.S.C. 154(b) by 0 days.

(21) Appl. No.: 13/379,288

(22) PCT Filed: Nov. 10, 2010

(86) PCT No.: PCT/CN2010/078615
§ 371 (c)(1),
(2), (4) Date: Dec. 19, 2011

(87) PCT Pub. No.: WO2011/069400
PCT Pub. Date: Jun. 16, 2011

(65) Prior Publication Data
US 2012/0100874 A1    Apr. 26, 2012

(30) Foreign Application Priority Data

Dec. 11, 2009    (CN) .......................... 2009 1 0188784

(51) Int. Cl.
*H04W 24/00*    (2009.01)
*H04M 3/493*    (2006.01)
*G01S 19/25*    (2010.01)
*G08B 1/08*    (2006.01)

(52) U.S. Cl.
USPC ............... 455/456.3; 455/457; 455/414.2; 342/357.64; 340/539.13

(58) Field of Classification Search
USPC ............ 455/456.1–457, 404.2, 414.1–414.2; 340/539.13; 342/357.64
See application file for complete search history.

(56) References Cited

U.S. PATENT DOCUMENTS

| 6,448,928 | B1 | 9/2002 | Knox et al. | |
|---|---|---|---|---|
| 2005/0070306 | A1* | 3/2005 | Kim et al. | 455/456.2 |
| 2005/0174286 | A1 | 8/2005 | Lokshin et al. | |
| 2005/0213511 | A1* | 9/2005 | Reece et al. | 370/252 |
| 2006/0046749 | A1* | 3/2006 | Pomerantz et al. | 455/457 |
| 2008/0228654 | A1* | 9/2008 | Edge | 705/71 |
| 2009/0040102 | A1 | 2/2009 | Medina Herrero et al. | |
| 2010/0138155 | A1 | 6/2010 | Du et al. | |
| 2011/0039576 | A1* | 2/2011 | Prakash et al. | 455/456.1 |
| 2011/0068974 | A1* | 3/2011 | Reese et al. | 342/357.4 |

FOREIGN PATENT DOCUMENTS

| CN | 1312912 A | 9/2001 |
|---|---|---|
| CN | 1748375 A | 3/2006 |
| CN | 1837845 A | 9/2006 |
| CN | 1870816 A | 11/2006 |

(Continued)

*Primary Examiner* — Vladimir Magloire
*Assistant Examiner* — Michael Mapa

(57) ABSTRACT

A method for a PC to realize an A-GPS in a PC technology field is provided. The method includes: a. the PC controlling a wireless network module of the PC to connect with a network to initiate a GPS positioning session; b. a location server transmitting GPS auxiliary information to the PC; c. the PC acquiring information of a current satellite according to the GPS auxiliary information. The method enables the A-GPS function to be applicable for the PC to provide positioning and navigation services to the PC. A corresponding A-GPS server can be connected to acquire the information of the current satellite based on the GPS auxiliary information with the network function provided by the wireless network module of the PC to accelerate the speed for acquiring data of the current satellite, and then current position information of the PC can be accurately calculated.

8 Claims, 2 Drawing Sheets

(56) References Cited

FOREIGN PATENT DOCUMENTS

| CN | 101315421 A | 12/2008 |
| CN | 101315423 A | 12/2008 |
| CN | 101452436 A | 6/2009 |
| CN | 101718872 A | 6/2010 |

* cited by examiner

METHOD FOR PC TO REALIZE A-GPS

BACKGROUND OF THE INVENTION

1. Field of the Invention

The present invention generally relates to a PC (personal computer) technology field, and more particularly to a method for a PC to realize an A-GPS (Assisted-Global Positioning System).

2. Description of Prior Art

An A-GPS, which stands for Assisted-GPS (Assisted-Global Positioning System), indicates a location server receiving and demodulating GPS satellite signals and then calculating corresponding GPS auxiliary parameters in accordance with an approximate position where a terminal is positioned, the GPS auxiliary parameters are issued to the terminal via a mobile communication network, such that the terminal can accelerate to acquire the GPS satellite signals by utilizing the GPS auxiliary parameters thereby decrease a requirement for intensity of the GPS satellite signals; and then the terminal accomplishes a pseudo-distance measurement by utilizing the GPS auxiliary parameters, and final position information is calculated by the terminal or a network server according to a result of the pseudo-distance measurement.

Applications of the A-GPS are classified into two modes: one is an SI mode indicating a mode in which the terminal initiates positioning, and another one is an NI mode indicating a mode in which the network server initiates positioning.

The A-GPS solution is superior in a positioning accuracy. In outdoor open areas, the accuracy thereof can reach 10 meters in a normal GPS operating environment, so that it is a positioning technique truly having the highest positioning accuracy at present. The A-GPS solution has another advantage that it takes only several seconds to have the first acquisition of the GPS signals, whereas a GPS might take 2~3 minutes to have the first acquisition of the GPS signals.

However, a problem of how to realize the A-GPS by a PC having a network function has not been solved in the prior arts. Consequently, there is a need to provide a technical scheme by which the A-GPS function is able to be realized on a PC.

SUMMARY OF THE INVENTION

An objective of the present invention is to provide a method for a PC to realize an A-GPS which can solve the problem of realizing the A-GPS by the PC.

The present invention implements a method for a PC to realize an A-GPS, the method comprises:

a. the PC controls a wireless network module of the PC for connecting with a network to initiate a GPS positioning session;

b. a location server transmits GPS auxiliary information to the PC;

c. the PC acquires information of a current satellite according to the GPS auxiliary information.

More particularly, it comprises the following step before the step a:

a0. the PC receives a positioning request transmitted by a location request server.

More particularly, the positioning request adopts a Wap Push message.

More particularly, the step b specifically comprises:

b1. the PC transmits a base station address thereof to the location server via the network;

b2. the location server transmits the GPS auxiliary information with respect to the base station address to the PC.

More particularly, the step c specifically comprises:

c1. the PC searches the current satellite according to the GPS auxiliary information, and acquires the information of the current satellite by a GPS module thereof.

More particularly, it comprises the following steps after the step c:

d1. the PC calculates a pseudo-distance from the PC to the current satellite according to the information of the current satellite;

d2. the PC calculates position information according to the pseudo-distance, and displays the position information by a UI (user interface).

More particularly, it comprises the following steps after the step c:

d1. the PC calculates a pseudo-distance from the PC to the current satellite according to the information of the current satellite;

d2. the PC transmits the pseudo-distance to the location server, the location server calculates position information according to the pseudo-distance and transmits the position information to the PC, the PC displays the position information by a UI.

More particularly, it comprises the following steps after the step c:

d1. the PC calculates a pseudo-distance from the PC to the current satellite according to the information of the current satellite;

d2. the PC calculates position information according to the pseudo-distance, and transmits the position information to the location request server.

More particularly, it comprises the following steps after the step c:

d1. the PC calculates a pseudo-distance from the PC to the current satellite according to the information of the current satellite;

d2. the PC transmits the pseudo-distance to the location server, the location server calculates position information according to the pseudo-distance, transmits the position information to the PC, and the PC transmits the position information to the location request server.

More particularly, the PC adopts AT commands when the PC controls the wireless network module of the PC for connecting with the network.

The prevent invention overcomes the deficiencies in the prior arts, in that the PC is connected to the network by the wireless network module thereof and acquires the GPS auxiliary information from the location server via the network, then the GPS module of the PC searches the current satellite based on the GPS auxiliary information, receives the information of the current satellite, and then proceeds to position according to the information of the current satellite. The technical scheme in accordance with the present invention enables the A-GPS function to be applicable for the PC, so as to provide positioning and navigation services to the PC. The key point is that a corresponding A-GPS server is connected to acquire the information of the current satellite based on the GPS auxiliary information with the network function provided by the wireless network module of the PC, so as to accelerate the speed for acquiring data of the current satellite, and then the current position information of the PC can be accurately calculated. The scheme provided in accordance with the embodiments of the present invention further can realize an NI mode positioning function of the PC for accomplishing the services of querying other positions.

DETAILED DESCRIPTION OF THE INVENTION

For a better understanding of the aforementioned content of the present invention, preferable embodiments are illustrated in accordance with the attached figures for further explanation. The following descriptions for the respective embodiments are specific embodiments capable of being implemented for illustrations of the present invention with referring to appended figures. As is understood by a person skilled in the art, the foregoing preferred embodiments of the present invention are illustrative rather than limiting of the present invention.

First Embodiment

A PC Having a Network Function Realizes an a-GPS by an SI Mode

Figure 1:
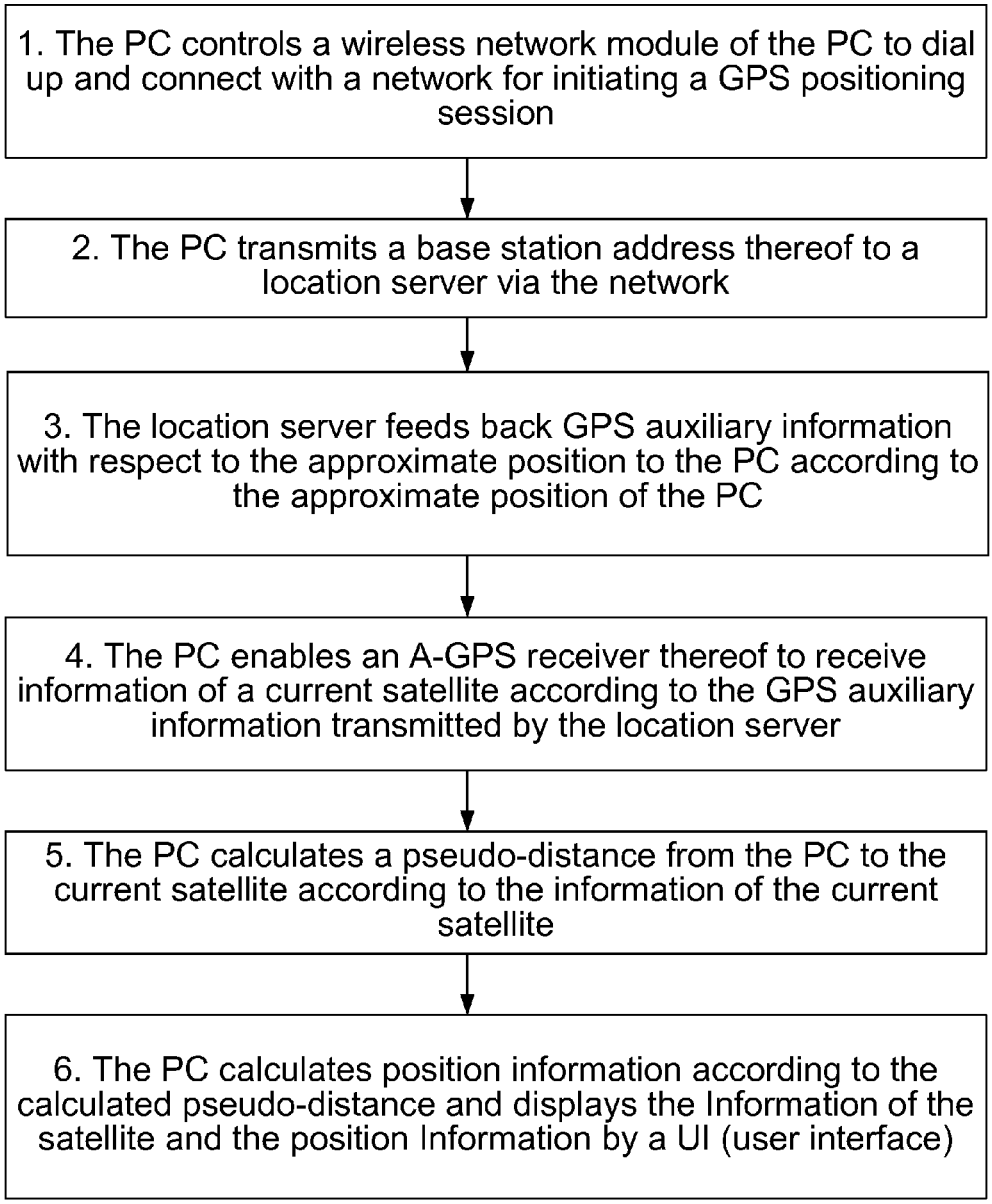
FIG. 1 shows a flow chart in accordance with a first embodiment of the present invention.

A flow chart in FIG. 1 shows that the PC having the network function realizes the A-GPS by the SI mode and comprises the following steps:

1. the PC controls a wireless network module of the PC to dial up and connect with a network for initiating a GPS positioning session;
2. the PC transmits a base station address thereof to a location server via the network;
3. the location server feeds back GPS auxiliary information with respect to the approximate position (base station address) to the PC according to the approximate position (base station address) of the PC;
4. the PC enables an A-GPS receiver thereof to receive information of a current satellite according to the GPS auxiliary information transmitted by the location server;
5. the PC calculates a pseudo-distance from the PC to the current satellite according to the information of the current satellite;
6. the PC calculates position information according to the calculated pseudo-distance and displays the information of the satellite and the position information by a UI (user interface).

When the technical scheme in accordance with the present invention is specifically utilized, the position information can be calculated according to the pseudo-distance after the PC calculates the pseudo-distance from the PC to the satellite, the pseudo-distance can also be transmitted to the location server via the network, the location server calculates the position information according to the pseudo-distance and transmits the calculated position information to the PC.

Second Embodiment

A PC Having a Network Function Realizes an a-GPS by an NI Mode

Figure 2:
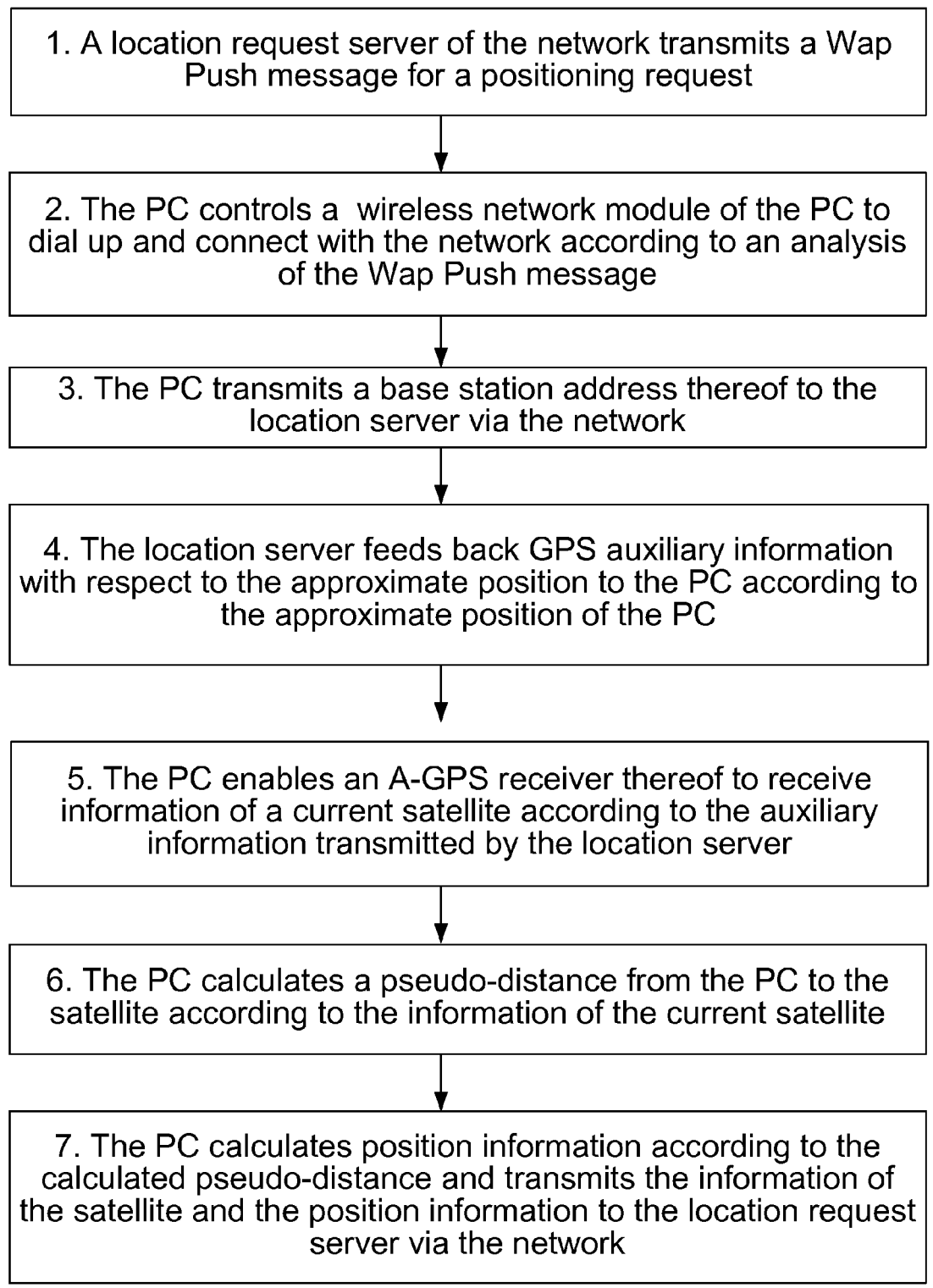
FIG. 2 shows a flow chart in accordance with a second embodiment of the present invention.

A flow chart in FIG. 2 shows that the PC having the network function realizes the A-GPS by the NI mode and specifically comprises the following steps:

1. a location request server of the network transmits a Wap Push message for a positioning request;
2. the PC controls a wireless network module of the PC to dial up and connect with the network according to an analysis of the Wap Push message;
3. the PC transmits a base station address thereof to the location server via the network;
4. the location server feeds back GPS auxiliary information with respect to the approximate position (base station address) to the PC according to the approximate position (base station address) of the PC;
5. the PC enables an A-GPS receiver thereof to receive information of a current satellite according to the auxiliary information transmitted by the location server;
6. the PC calculates a pseudo-distance from the PC to the satellite according to the information of the current satellite;
7. the PC calculates position information according to the calculated pseudo-distance and transmits the information of the satellite and the position information to the location request server via the network.

When the technical scheme in accordance with the present invention is specifically utilized, the position information can be calculated according to the pseudo-distance after the PC calculates the pseudo-distance from the PC to the satellite, the pseudo-distance can also be transmitted to the location server via the network, the location server calculates the position information according to the pseudo-distance and transmits the calculated position information to the PC, and then the PC transmits the information of the satellite and the position information to the location request server via the network.

In the present embodiment, when the PC realizes the A-GPS function by the NI mode, the Wap Push message transmitted by the location request server is required to be separated. The Wap Push message transmitted by the location request server is a Push message including specific identification, so it can be separated from a multimedia message and other types of Push messages.

A Content Type field and an Application ID field which are included in the Wap Push message for a positioning request are respectively shown as below:

| Content Type | Application ID |
|---|---|
| application/vnd.omaloc-supl-init | x-oma-application:ulp.ua |

The PC can separate the Wap Push message for the positioning request by the above-mentioned fields, and then a process of a positioning session is enabled according to information of the Wap Push.

The PC realizing the A-GPS by the NI mode can also realize services of querying other positions.

In the first and second embodiments, the PC can adopt corresponding dial-up AT commands when the PC controls the wireless network module of the PC to dial up and connect with the network, for example:

ATD*99#<CR>

The connection of the wireless network module with the network has to be checked each time before the GPS positioning session is required to be enabled. The dial-up connection is required first if there is no connection. The PC further needs to acquire several important wireless network parameters before the PC proceeds to A-GPS position:

MCC—Mobile Country Code;
MNC—Mobile Network Code;
LAC—Location Area Code;
CID—Cell Identifier;
IMSI—International Mobile Subscriber Identity.

The above-mentioned parameters can be acquired by the AT commands:

AT+CCED=0,1<CR> or AT(_)DCNL<CR> can acquire MCC, MNC, LAC, and CID parameter information;

AT+CIMI<CR> can acquire IMSI parameter information.

Furthermore, an upper layer application of the PC acquires the information of the satellite and the position information by an NMEA (National Marine Electronics Association) format data, which is transmitted by a low level driver of the PC. After the low level driver of the PC acquires the information of the current satellite and the position information, the acquired information of the current satellite and the position information are converted into the NMEA format data and then transmitted to the upper layer application to analyze. In the NMEA data, the data of $GPGGA field indicates GPS position data which comprises time, position, and data with respect to a GPS receiver; the data of $GPGSA field indicates the current excited satellite; $GPGSV field indicates the information of the currently visible satellite and so on. Embodiment contents can be referenced in NMEA protocol data.

As mentioned above, the technical scheme in accordance with the present invention enables the A-GPS function to be applicable for the PC, so as to provide positioning and navigation services to the PC. The key point is that a corresponding A-GPS server is connected to acquire the information of the current satellite based on the GPS auxiliary information with the network function provided by the wireless network module of the PC, so as to accelerate the speed for acquiring data of the current satellite, and then the current position information of the PC can be accurately calculated. The scheme provided in accordance with the embodiments of the present invention further can realize an NI mode positioning function of the PC for accomplishing the services of querying other positions.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

The invention claimed is:

1. A method for a PC (personal computer) to realize an A-GPS (Assisted-Global Positioning System), the method comprising:
   a0. the PC receiving a positioning request transmitted by a location request server:
   a. the PC controlling a wireless network module of the PC for connecting with a network to initiate a GPS positioning session;
   b. a location server transmitting GPS auxiliary information to the PC, the step b comprising:
      b1. the PC transmitting a base station address thereof to the location server via the network; and
      b2. the location server transmitting the GPS auxiliary information with respect to the base station address to the PC;
   c. the PC acquiring information of a current satellite according to the GPS auxiliary information, the step c comprising:
      c1. the PC searching the current satellite according to the GPS auxiliary information, and acquiring the information of the current satellite by a GPS module thereof;
   d1. the PC calculating a pseudo-distance from the PC to the current satellite according to the information of the current satellite; and
   d2. the PC transmitting the pseudo-distance to the location server, the location server calculating the position information according to the pseudo-distance, transmitting the position information to the PC, and the PC transmitting the position information to the location request server;
   wherein an upper layer application of the PC acquires the information of the current satellite and position information by an NMEA (National Marine Electronics Association) format data, which is transmitted by a low level driver of the PC, after the low level driver of the PC acquires the information of the current satellite and the position information, the acquired information of the current satellite and the position information are converted into the NMEA format data and then transmitted to the upper layer application to analyze.

2. The method of claim 1, wherein the positioning request adopts a Wap (wireless application protocol) Push message.

3. The method of claim 1, wherein the method comprises the following step after the step c:
   the PC displaying the position information by a UI (user interface).

4. The method of claim 1, wherein the PC adopts AT commands (Attention commands) when the PC controls the wireless network module of the PC to connect with the network.

5. A method for a PC (personal computer) to realize an A-GPS (Assisted-Global Positioning System), the method comprising:
   a0. the PC receiving a positioning request transmitted by a location request server:
   a. the PC checking whether a wireless network module of the PC is connected with a network;
   the PC controlling the wireless network module of the PC to connect with the network to initiate a GPS positioning session by adopting dial-up AT commands (Attention commands) if the wireless network module of the PC is not connected with the network;
   b. a location server transmitting GPS auxiliary information to the PC, the step b comprising:
      b1. the PC transmitting a base station address thereof to the location server via the network; and
      b2. the location server transmitting the GPS auxiliary information with respect to the base station address to the PC; and
   c. the PC acquiring information of a current satellite according to the GPS auxiliary information, the step c comprising:
      c1. the PC searching the current satellite according to the GPS auxiliary information, and acquiring the information of the current satellite by a GPS module thereof,
   d1. the PC calculating a pseudo-distance from the PC to the current satellite according to the information of the current satellite;
   d2. the PC transmitting the pseudo-distance to the location server, the location server calculating the position information according to the pseudo-distance, transmitting the position information to the PC, and the PC transmitting the position information to the location request server;
   wherein an upper layer application of the PC acquires the information of the current satellite and position information by an NMEA (National Marine Electronics Association) format data, which is transmitted by a low level driver of the PC, after the low level driver of the PC acquires the information of the current satellite and the position information, the acquired information of the current satellite and the position information are converted into the NMEA format data and then transmitted to the upper layer application to analyze.

6. The method of claim 5, wherein the positioning request adopts a Wap (wireless application protocol) Push message.

7. The method of claim 6, wherein the Wap (wireless application protocol) Push message comprises a Content Type field and an Application ID field.

8. The method of claim 7, wherein the PC separates the Wap (wireless application protocol) Push message by the Content Type field and the Application ID field, and a process of the GPS positioning session is enabled according to information of the Wap (wireless application protocol) Push.

* * * * *